Feb. 28, 1961 A. J. KLOSE 2,973,008
VALVE
Filed Jan. 9, 1958
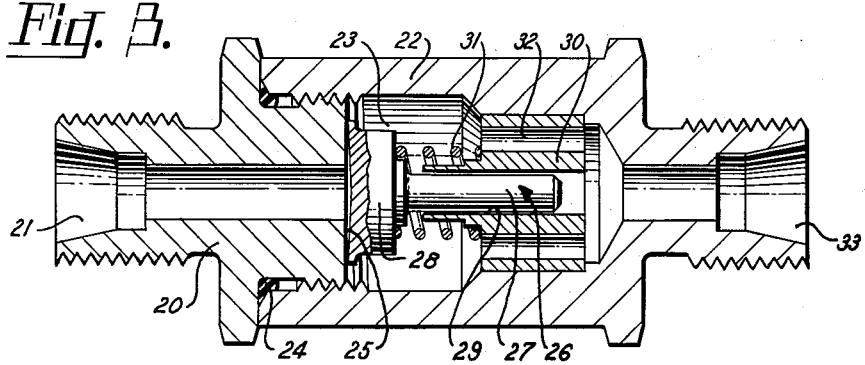
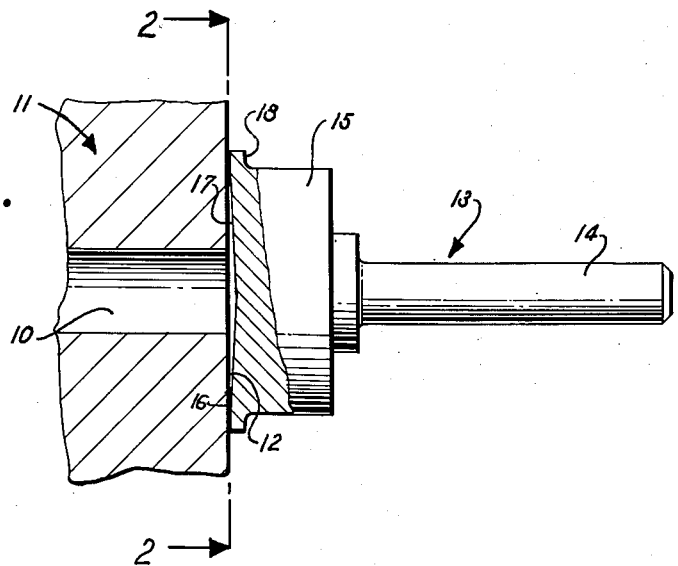
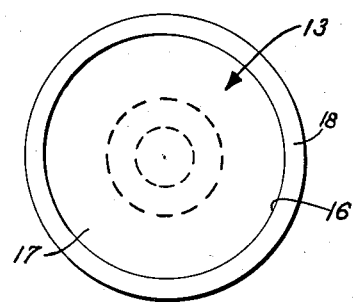
INVENTOR.
ALFRED J. KLOSE
BY
Christie, Parker & Hale
ATTORNEYS United States Patent Office 2,973,008
Patented Feb. 28, 1961

2,973,008
VALVE

Alfred J. Klose, Rolling Hills, Calif., assignor to Wallace O. Leonard, Inc., Pasadena, Calif., a corporation of California Filed Jan. 9, 1958, Ser. No. 707,905

2 Claims. (Cl. 137—516.29)

This invention relates to a valve and particularly to a valve sealing element.

In many flow control applications, effective sealing is required over a wide range of fluid pressures and throughout repeated seating and unseating of the valve. Such dependability of sealing performance must be achieved through the use of valves permitting simple construction and easy assembly since many flow systems require the use of a large number of valves, such as, for example, check valves.

The uncomplicated design of poppet valves makes such valves particularly well-suited for systems requiring flow control. With regard to economy of construction, the simplest poppet valve design utilizes a flat surface surrounding a circular flow passage as a seating surface and a poppet having a sealing element of a diameter greater than the flow passage. However, where metallic poppets and sealing surfaces are used, effective sealing is initially obtained only after time-consuming machining and lapping of the mating surfaces. In addition, the sealing characteristic deteriorates because of wear produced by repeated seating and unseating of the valve elements over a prolonged period.

The properties of certain organic plastic materials offer advantages in the use of these materials in valve construction. Materials, such as polytetrafluoroethylene, known under the name "Teflon," polytrifluorochloroethylene, known under the name "Kel–F," and the polyamides or nylons, possess a resilient characteristic. A poppet made of such a plastic produces an effective seal when pressed against a seating surface since the resilient property of the sealing element of the poppet permits the closest possible contact between the mating surfaces. In addition, wear of the mating surfaces is minimized so effective sealing is obtainable over repeated cycling of the valve elements.

While the plastics described above are generally resistive to elevated temperatures and pressures, such conditions cause "cold flow" of these materials. Therefore, if plastic poppets are used in the simple poppet valve design previously described, extrusion of the plastic into the flow passage occurs under the influence of elevated pressures or temperatures. The resultant deformation of the sealing element interferes with subsequent proper seating of the valve and deteriorates the sealing effectiveness.

The present invention provides a poppet design which derives the benefits attainable through the use of plastic poppets and permits the use of the poppet under conditions of elevated pressure without deteriorative effect upon the sealing effectiveness of the valve. The present invention is a valve structure combining a body defining a flow passage and an annular shoulder surrounding the flow passage and forming a seating surface with a poppet of resilient plastic material. The sealing element of the poppet is a peripheral rim formed as an integral part of the poppet around a centrally-formed recess. When a force is applied axially with respect to the poppet and against the seating surface, the peripheral rim is pressed into sealing engagement with the seating surface. However, the surface of the recess is maintained spatially separated from the portion of the flow passage coplanar with the seating surface.

The recess is formed so that, under conditions producing cold flow of the plastic, a portion of the recess surface is pressed into sealing engagement with the seating surface but no portion of the plastic forming the recess surface is extruded into the flow passage. In this manner, the cold flow characteristic of the plastic does not adversely affect the sealing element by deformation of the mating surface of the sealing element.

The design of the poppet in the valve structure of the invention permits utilization of a poppet valve design of maximum simplicity with attendant advantages of economy, ease of assembly and dependable sealing performance over a wide pressure range and throughout repeated cycling of the valve elements.

The sealing element according to the invention and its manner of operation will be more clearly understood from the following description taken in conjunction with the accompanying drawings in which:

Fig. 1 is an elevational view, partially sectioned, of a preferred embodiment of the sealing element according to the invention and shows a poppet in sealing engagement with a seating surface;

Fig. 2 is a view taken along line 2—2 of Fig. 1; and

Fig. 3 is a sectional elevational view of the sealing element according to the invention in one embodiment of a check valve.

With reference to Figs. 1 and 2 a cylindrical flow passage 10 formed in a valve body 11 is surrounded by a flat seating surface 12. While not so limited, the seating surface in the preferred embodiment is made of a metal, such as stainless steel, which provides both corrosion resistance and wear resistance.

A poppet 13 comprises a stem portion 14 and a cylindrical sealing element 15. On one end, the sealing element is joined to the stem. On the other end the sealing element has a peripheral rim 16, particularly shown in Fig. 2, formed around a conically shaped recess 17. The inner diameter of the rim is greater than the diameter of the flow passage. In the preferred embodiment, a right cone is formed, the lateral surface of the cone beginning at the inner diameter of the peripheral rim. To insure sealing at low pressures, a lip 18, integrally formed as part of the sealing element and located annularly with respect to the peripheral rim, is provided in the preferred embodiment. This lip is essentially a thin membrane of the plastic material and provides a seal when pressed against the seating surface by a low pressure applied coaxially with respect to the poppet.

The angular inclination of the cone with respect to the seating surface is dependent upon the particular plastic material used in the construction of the poppet. For example, when the poppet is made of plastics such as polytetrafluoroethylene, polytrifluorochloroethylene or polyamides, the preferred angular inclination ranges from 2° to 5°. Expressed as a ratio of the slant height to the altitude of the cone, a range from about 11 to about 29 may be employed. The angular inclination is important because, under conditions causing cold flow of the plastic, a proper angular inclination causes a portion of the lateral surface of the cone to be pressed into sealing engagement with the seating surface. In this manner, advantage is taken of the cold flow characteristic to increase the sealing effectiveness of the valve structure according to the invention. In addition, however, the angular inclination must be sufficiently great so that no portion of the plastic forming the lateral surface of the cone is extruded into the flow passage below the point where the flow passage is coplanar with the seating surface. Since the cold flow characteristic varies among plastic materials suitable for use in the poppet construction, the proper angular inclination of the cone must be determined for each plastic. For example, when nylon, the plastic material used in the preferred embodiment, is used for construction of the poppet, the preferred angular inclinatiton of the cone is 3° ± ½°.

In operation, the sealing element of the poppet rests along its peripheral rim on the seating surface in the absence of a force acting coaxially with respect to the poppet. Upon the application of a coaxial force, the peripheral rim of the sealing element is cross axially expanded against the seating surface. The resilient nature of the plastic permits close contact between the two mating surfaces so that effective sealing is obtained even when forces low in magnitude are applied. As previously explained when conditions causing cold flow of the plastic arise, the sealing surface is increased by reason of extrusion of the plastic forming the portion of the cone nearest the peripheral rim into engagement with the seating surface. So long as the elastic limit of the plastic material is not exceeded no permanent deformation of the sealing element occurs and repetitive use over prolonged periods of time is possible.

It is apparent that modifications of the sealing element may be made without departing from the basic concept of the invention. For example, the peripheral rim of the sealing element may be widened to form a band thereby providing a larger initial seating area. In addition, the lip as provided in the preferred embodiment for low pressure sealing may be modified.

With reference to Fig. 3 the valve structure according to the invention is shown in a check valve. A hexagonal fitting 20 containing a cylindrical inflow port 21 is joined to a housing 22 to form an enclosure 23. The enclosure is made fluid tight by means of an O-ring 24. A seating surface 25 surrounds the inflow port. A poppet 26 having a stem 27 and a cylindrical sealing element 28, and in other respects identical to that described in Figs. 1 and 2, is placed within the enclosure so that the peripheral rim of the sealing element circumscribes the inflow port. The stem of the poppet is slidably fitted in a guide bore 29 formed within a guide piece 30 rigidly fitted within the upper portion of the enclosure. A spring 31, helically circumscribing the stem, is compressed between the upper end of the sealing element and the lower end of the guide piece. The compressive force of the spring is sufficient to maintain the sealing element against the seating surface and to prevent leakage past the sealing element at low pressures. Ports 32 are provided in the guide piece to permit flow from the enclosure into an outflow fluid port 33 formed in the housing.

In operation, an inlet flow pressure sufficient to overcome any outflow back pressure plus the pressure exerted by the spring causes the poppet to be disengaged from the seating surface so that fluid flow through the inflow port occurs. When the outflow back pressure plus the spring pressure exceeds the inflow pressure, the sealing element of the poppet is forced into sealing engagement with the seating surface. The manner in which effective sealing is obtained is the same as was described in conjunction with Figs. 1 and 2.

The sealing element according to the invention has been used in embodiments, such as that shown in Fig. 3, where outflow pressures were as high as 6000 to 7000 p.s.i. The sealing element can be effectively used over an operating range varying from very small pressures to pressures as high as 5000 p.s.i. In addition, in an embodiment such as that shown in Fig. 3, a poppet according to the invention was cycled in excess of 150,000 times at an operating pressure of 3000 p.s.i. without deteriorative effect upon the sealing effectiveness.

The unique design of the poppet according to the invention permits the use of plastic poppets and derives the benefits of the advantages inherent in such materials. Furthermore, the design according to the invention avoids the disadvantages heretofore encountered in the use of plastic materials under conditions producing cold flow of the plastics. The simple construction of the valve permits mass production of the valve structure, and its durable nature, providing a long life of sealing effectiveness, makes it readily adaptable to a wide number of uses in flow control systems.

I claim:

1. A valve structure comprising a body defining a flow passage and forming a planar seating surface surrounding the flow passage, and a poppet of a resilient plastic material selected from the group consisting of polyamides, polytetrafluoroethylenes and polychlorotrifluoroethylenes, said poppet including a sealing element having a peripheral rim substantially parallel to the seating surface and bearing thereon, a first surface defining a recess in the shape of a right cone with its base coplanar with the peripheral rim, and a second surface opposite to the peripheral rim and spaced from said first surface by a substantial thickness of said plastic material, said recess being aligned with the flow passage and having a ratio of slant height to altitude in the range from 11 to 29 so that responsive to pressure on said second surface of the sealing element a portion of said first surface is pressed into sealing engagement with the seating surface and the portion of said first surface disposed over the flow passage remains spatially separated therefrom.

2. A valve structure comprising a body defining a flow passage and forming a planar seating surface surrounding the flow passage, and a nylon poppet including a sealing element having a peripheral rim substantially parallel to the seating surface and bearing thereon, a first surface defining a recess in the shape of a right cone with its base coplanar with the peripheral rim, and a second surface opposite to the peripheral rim and spaced therefrom by a substantial thickness of nylon, said recess being aligned with the flow passage and having an angular inclination of about 3° so that responsive to pressure on said second surface of the sealing element a portion of said first surface is pressed into sealing engagement with the seating surface and the portion of said first surface disposed over the flow passage remains spatially separated therefrom.

References Cited in the file of this patent

UNITED STATES PATENTS

| | | |
|---|---|---|
| 1,530,924 | Biedermann | Mar. 24, 1925 |
| 2,214,346 | Pim | Sept. 10, 1940 |
| 2,346,938 | Oravec | Apr. 18, 1944 |
| 2,594,641 | Griffith | Apr. 29, 1952 |
| 2,812,772 | Moore | Nov. 12, 1957 |
| 2,857,131 | Cole | Oct. 21, 1958 |

FOREIGN PATENTS

| | | |
|---|---|---|
| 465,242 | Italy | of 1951 |